United States Patent
Nakamura et al.

(10) Patent No.: US 10,494,448 B2
(45) Date of Patent: Dec. 3, 2019

(54) APPARATUS FOR CONTINUOUSLY PRODUCING CHEMICALLY-MODIFIED CELLULOSE AND METHOD USED IN SAME

(71) Applicant: THE JAPAN STEEL WORKS, LTD., Tokyo (JP)

(72) Inventors: Satoru Nakamura, Hiroshima (JP); Ryo Ishiguro, Hiroshima (JP); Mariko Yoshioka, Kyoto (JP); Yoshiyuki Kushizaki, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 15/762,256

(22) PCT Filed: Sep. 30, 2016

(86) PCT No.: PCT/JP2016/079072
§ 371 (c)(1),
(2) Date: Mar. 22, 2018

(87) PCT Pub. No.: WO2017/057699
PCT Pub. Date: Apr. 6, 2017

(65) Prior Publication Data
US 2018/0265599 A1      Sep. 20, 2018

(30) Foreign Application Priority Data

Sep. 30, 2015   (JP) ................... 2015-193280

(51) Int. Cl.
*C08B 17/02* (2006.01)
*B01J 19/20* (2006.01)
(Continued)

(52) U.S. Cl.
CPC .......... *C08B 17/02* (2013.01); *B01F 7/00416* (2013.01); *B01F 15/00993* (2013.01);
(Continued)

(58) Field of Classification Search
CPC ... C08B 17/02; C08B 3/16; C08B 3/12; B01F 15/0235; B01F 15/00993; B01F 7/00416;
(Continued)

(56) References Cited

U.S. PATENT DOCUMENTS

| | | | |
|---|---|---|---|
| 2010/0136324 A1* | 6/2010 | Ohno | ............... B29B 7/484 428/326 |
| 2014/0227605 A1 | 8/2014 | Nakamura et al. | |

(Continued)

FOREIGN PATENT DOCUMENTS

| | | | |
|---|---|---|---|
| JP | 2009-293167 | 12/2009 | |
| JP | 2014-234472 | 12/2014 | |
| WO | WO-2014196551 A1 * | 12/2014 | ............... C08J 5/18 |

OTHER PUBLICATIONS

International Preliminary Report on Patentability dated Apr. 3, 2018 in International Application No. PCT/JP2016/079072.
(Continued)

*Primary Examiner* — Lessanework Seifu
(74) *Attorney, Agent, or Firm* — Wenderoth, Lind & Ponack, L.L.P.

(57) ABSTRACT

An apparatus for continuously producing chemically-modified cellulose, the apparatus having a first mechanism for transporting a fine-powder cellulose fiber starting material and a hydrophobizing chemical substance, a specific extruder, a solvent tank connected to the extruder, and a dryer connected to the solvent tank, and a method for continuously producing chemically-modified cellulose, the method having a step of washing, in the solvent tank, chemically-modified cellulose having been produced out of the fine-powder cellulose fiber starting material and the hydrophobizing chemical substance in the extruder, and then drying the chemically-modified cellulose in the dryer, in order to remove any unreacted hydrophobizing chemical substance.

22 Claims, 10 Drawing Sheets

(51) Int. Cl.
| | |
|---|---|
| B01F 7/00 | (2006.01) |
| B01F 15/00 | (2006.01) |
| B01F 15/02 | (2006.01) |
| B29C 48/03 | (2019.01) |
| C08B 3/12 | (2006.01) |
| C08B 3/16 | (2006.01) |
| H01M 2/16 | (2006.01) |
| B29C 48/505 | (2019.01) |
| B82Y 40/00 | (2011.01) |
| B29K 1/00 | (2006.01) |

(52) U.S. Cl.
CPC ........... *B01F 15/0235* (2013.01); *B01J 19/20* (2013.01); *B29C 48/03* (2019.02); *B29C 48/505* (2019.02); *C08B 3/12* (2013.01); *C08B 3/16* (2013.01); *H01M 2/16* (2013.01); *H01M 2/1626* (2013.01); *B29K 2001/08* (2013.01); *B82Y 40/00* (2013.01)

(58) Field of Classification Search
CPC .. B29C 47/60; B29C 47/0009; H01M 2/1626; B29K 2001/08; B82Y 40/00; B01J 19/20
See application file for complete search history.

(56) References Cited

U.S. PATENT DOCUMENTS

| | | | | |
|---|---|---|---|---|
| 2016/0133902 A1* | 5/2016 | Nakamura | ................ | C08J 5/18 |
| | | | | 429/249 |
| 2016/0152811 A1* | 6/2016 | Gardner | ................ | C08L 23/12 |
| | | | | 524/35 |

OTHER PUBLICATIONS

Nakamura et al., "Development of the production process for the lithium-ion battery separator", Japan Steel Works Technical Review, Oct. 2013, (64), pp. 28-36. (Cited in IPRP & English Abstract).
Ishiguro et al., "LIB-yo Cellulose Nanofiber Fukugoka Polyethylene (PE) Separator no Kaihatsu", Journal of Japan Society of Polymer Processing (Nenji Taikai), May 14, 2013, 24, pp. 87-88. (Cited in IPRP & English Abstract).
Ishiguro et al., "Development of the Polyethylene and Cellulose Nanofiber Composites Separator Film for LIB", Journal of the Japan Society of Polymer Processing, Jan. 20, 2015, 27(2), pp. 65-67. (Cited in IPRP).
Nakamura et al., "LIB-yo Cellulose Nanofiber Fukgoka Polyethylene (PE) Separator no Kaihatsu" Abstracts of Annual Meeting of the Electrochemical Society of Japan, Mar. 29, 2013, 80, p. 151 (Cited in IPRP).
Yoshioka et al., "Jisedai Lithium-Ion Denchi-yo Cellulose Nanofiber Hokyo Separator Film no Kaihatsu", Abstracts of the Annual Meeting of the Japan Wood Research Society (Kanzenban), 2013, 63, J27-03-1645. (Cited in IPRP).
Extended European Search Report dated Jul. 3, 2019 in EP App. No. 16851868.6.
Partial English Translation of Nakamura et al., "Development of the production process for the lithium-ion battery separator", Japan Steel Works Technical Review, Oct. 2013, (64), pp. 28-36. (Cited in IPRP & English Abstract); previously cited in IDS filed on Aug. 19, 2019.
Partial English Translation of Ishiguro et al., "LIB-yo Cellulose Nanofiber Fukugoka Polyethylene (PE) Separator no Kaihatsu", Journal of Japan Society of Polymer Processing (Nenji Taikai), May 14, 2013, 24, pp. 87-88. (Cited in IPRP & English Abstract); previously cited in IDS filed on Aug. 19, 2019.
Partial English Translation of Ishiguro et al., "Development of the Polyethylene and Cellulose Nanofiber Composites Separator Film for LIB", Journal of the Japan Society of Polymer Processing, Jan. 20, 2015, 27(2), pp. 65-67. (Cited in IPRP); previously cited in IDS filed on Aug. 19, 2019.
Partial English Translation of Nakamura et al., "LIB-yo Cellulose Nanofiber Fukgoka Polyethylene (PE) Separator no Kaihatsu" Abstracts of Annual Meeting of the Electrochemical Society of Japan, Mar. 29, 2013, 80, p. 151 (Cited in IPRP); previously filed in IDS filed on Aug. 19, 2019.
Partial English Translation of Yoshioka et al., "Jisedai Lithium-Ion Denchi-yo Cellulose Nanofiber Hokyo Separator Film no Kaihatsu", Abstracts of the Annual Meeting of the Japan Wood Research Society (Kanzenban), 2013, 63, J27-03-1645. (Cited in IPRP); previously cited in IDS filed on Aug. 19, 2019.

* cited by examiner

APPEARANCE OF THIN - FILM EVAPORATOR 30

APPEARANCE OF TABLE TENTER APPARATUS 31

FILM SHEET DEGREASING

EXAMPLE 1: SEM OBSERVATION RESULTS UNDER CONDITION 1

EXAMPLE 2: SEM OBSERVATION RESULTS

EXAMPLE 1: EDX ANALYSIS RESULTS UNDER CONDITION 1

APPARATUS FOR CONTINUOUSLY PRODUCING CHEMICALLY-MODIFIED CELLULOSE AND METHOD USED IN SAME

TECHNICAL FIELD

The present invention relates to an apparatus for continuously producing chemically-modified cellulose and to a method for continuously producing chemically-modified cellulose. Specifically, the present invention relates to an apparatus and a method for producing chemically-modified cellulose by allowing a fine-powder cellulose fiber starting material to react continuously with a hydrophobizing chemical substance. Further, the present invention relates to an apparatus and a method for continuously producing a cellulose composite resin using the obtained chemically-modified cellulose, and to an apparatus for continuously producing a separator for lithium ion batteries, using the cellulose composite resin, and to a cellulose nanofiber composite separator for lithium ion batteries produced using that apparatus.

BACKGROUND ART

Fiber reinforced plastics resulting from compositing fiber materials and thermoplastic resins have come to be used in recent years in various products. Examples include, for instance, GFRPs and CFRPs, in which glass fibers, carbon fibers or the like are composited with resins, and which are widely used in the fields of automobile parts, sports goods, housing materials, home appliances and the like. Articles obtained through compositing of such fibers exhibit excellent strength characteristics. However, the disposal methods resorted thereto in order to dispose of these articles are problematic, for instance, in that recycling is difficult, and in that a significant environmental burden is incurred.

Against this background, it is desirable for plastic composite materials to be lightweight and have excellent strength characteristics, and to be disposable at low cost, which translates into a small environmental burden. Cellulose fibers, which are abundant natural resources and have excellent strength characteristics, have attracted attention as reinforcing fibers that combine the above features, and are thus being actively researched.

Numerous research studies are being conducted on compositing of resins and cellulose nanofibers in which cellulose size is of the order of nanometers. Fiber diameters used ordinarily in papermaking, filter membranes and the like lie in a range of about 10 m to 50 μm. In cellulose nanofibers, on the other hand, fiber diameter is made $\frac{1}{100}$ to $\frac{1}{10,000}$ finer, down to the nanoscale; cellulose nanofibers are accordingly expected to bring out functions, such as reinforcement of resin crystals, different from those when ordinary fibers are used. As compared with conventional fiber-reinforced plastics, such fiber-reinforced plastics obtained through compositing of cellulose nanofibers and resins are expected to be applied to and further implemented in various products by bringing out a reinforcing function unknown as yet in conventional art while incurring a small environmental burden.

Herein Patent Documents 1 to 3 illustrated in the examples below were published for the purpose of using cellulose as a composite material.

CITATION LIST

Patent Document

[Patent Document 1] Japanese Patent Application Publication No. 2012-188654

[Patent Document 2] Japanese Patent Application Publication No. 2005-194314

[Patent Document 3] Japanese Patent Application No. 2009-293167

SUMMARY OF THE INVENTION

Technical Problem

Cellulose has hydroxyl groups in the molecular structure, and accordingly exhibits high hydrophilicity and cohesiveness, brought about by hydrogen bonds within molecules and between molecules. As a result, cellulose is known to be very difficult to disperse in thermoplastic resins, in particular in highly hydrophobic olefinic resins. When using fibrous cellulose, and in particular cellulose having been made fine down to nanofibers, cellulose fibers are known to re-aggregate with each other during mixing with a resin, giving rise to coarse cellulose aggregates. As a result, not only do strength characteristics and dimensional stability, supposedly achievable through addition of cellulose, fail to materialize, but also further problems arise in that, for instance, strength and transparency decrease, with such aggregates as starting points. Accordingly, active research is being conducted on stability derived from enhancing dispersibility and suppressing aggregation of cellulose in resins.

First, for instance Patent Documents 1 and 2, propose methods for compositing cellulose and resins. In these methods a resin is first kneaded with a water slurry obtained through dispersion of defibrated cellulose, to produce cellulose-composited pellets. In this method, nanofibrillated cellulose is used, which is obtained, for instance, as a result of a high-pressure homogenizer process of a slurry having had a cellulose starting material added thereto beforehand. To produce pellets, therefore, a degassing step is required in which the amount of water that causes aggregation of nanofibrillated cellulose is reduced. When performing degassing and dewatering using a kneader, however, moisture can only be removed from the surface of the resin, and accordingly the pellets must be produced in accordance with a special kneading method that involves frequent surface renewal, which calls for high screw design technology. In such a method a homogenizer process is carried out beforehand in order to nanofibrillate the cellulose. In this homogenizer process defibration is accomplished by relying on shear forces that are exerted as a starting material passes through narrow gaps, while pressurized under high or ultrahigh pressure. However, complete defibration is difficult to accomplish in one single process, and in consequence the same process must be carried out a plurality of times. This process is accordingly implemented as a batch process, and it has been difficult to continuously produce defibrated cellulose nanofibers.

Patent Document 3 proposes a method for chemical modification of a cellulose surface, with the aim of improving the dispersed state of cellulose in a resin and enhancing the mechanical characteristics of the resin. In this method carboxyl groups are introduced into some of the hydroxyl groups of cellulose through a half-esterification process with a polybasic acid anhydride; thereby, repulsive forces are induced between microfibrils, which in turn allows a stable dispersed state to be maintained in a dispersion. It is found that strength characteristics and dimensional stability are enhanced as a result during compositing with a resin. The cellulose nanofibers in the dispersion are however in a microfibril state, and to achieve such a state it is necessary to resort to the homogenizer process, or to a starburst process (Counter collision process) relying on high-speed head-on impingement, which entails a more complex process with greater equipment requirements. All the foregoing drives up costs and constitutes a hurdle for wider adoption in the market. In the above method, pressure kneaders, multi-screw extruders and the like are used as reaction equipment. Here in at least about 20 minutes of residence time are required in order to gain reaction time while precluding resin degradation, due to heat generated by shearing between cellulose fibers during kneading of the cellulose with a substance for chemical modification, or as a result of shearing with the screw and the cylinder, when relying on ordinarily used flight shapes alone. This has been problematic in that industrial continuous production is rendered difficult as a result. As a further problem, for instance a washing operation for removing unreacted products of substances used in the chemical modification and a drying operation are independent processes, and therefore these operations cannot be carried out continuously.

Such a method and an apparatus for chemical modification of cellulose and compositing with a resin are illustrated in an upstream process example of FIG. 11. Such an upstream step is known to be effective as a method for chemically modifying a cellulose surface, but no system or method has been developed that allows performing a chemical modification process, defibration of fibers, or compositing with a resin in a continuous manner. As a result, no progress is being made in terms of mass production and cost reduction, the upshot being limited adoption in the market thus far.

Solution to the Problem

It is an object of the present invention to solve such conventional problems.

Specifically, the present invention provides an apparatus for continuously producing chemically-modified cellulose that is obtained by reacting a fine-powder cellulose fiber material and a hydrophobizing chemical substance, and a method that is used in the apparatus.

The present invention also provides an apparatus for continuously producing a cellulose composite resin from a fine-powder cellulose fiber starting material, and a method that is used in the apparatus.

The present invention also provides an apparatus for continuously producing a cellulose nanofiber composite separator for lithium ion batteries, from a fine-powder cellulose fiber starting material, and a cellulose nanofiber composite separator for lithium ion batteries produced using the apparatus.

Specifically, the present invention provides an apparatus for continuously producing chemically-modified cellulose, the apparatus having:

a first mechanism (6a) for transporting a fine-powder cellulose fiber starting material (6) and a hydrophobizing chemical substance;

an extruder (4) having a hopper (5) for introducing the cellulose fiber starting material (6) and the hydrophobizing chemical substance, and having a temperature raising mechanism, a pressure raising mechanism and a degassing mechanism, and moreover having a screw piece for kneading;

a solvent tank (25) connected to the extruder; and a dryer (12) connected to the solvent tank.

The present invention also provides a method for continuously producing chemically-modified cellulose, the method including:

a first step of introducing a fine-powder cellulose fiber starting material (6) and a hydrophobizing chemical substance into an extruder having a temperature raising mechanism, a pressure raising mechanism and a degassing mechanism, and having a screw piece for kneading, melting the hydrophobizing chemical substance and kneading the hydrophobizing chemical substance and the cellulose, and further allowing the same to react, in order to yield chemically-modified cellulose; and a second step of discharging the chemically-modified cellulose from the extruder, introducing the chemically-modified cellulose into a solvent tank (25) and dispersing the chemically-modified cellulose in an organic solvent, in order to yield a fluid dispersion, and thereafter injecting the fluid dispersion into a dryer (12) connected to the solvent tank, and drying the fluid dispersion, in order to separate the chemically-modified cellulose from the organic solvent.

The present invention also provides an apparatus for continuously producing a cellulose composite resin, the apparatus having:

a first mechanism (6a) for transporting a fine-powder cellulose fiber starting material (6) and a hydrophobizing chemical substance;

a first extruder having a hopper (5) for introducing the cellulose fiber starting material (6) and the hydrophobizing chemical substance, and having a temperature raising mechanism, a pressure raising mechanism and a degassing mechanism, and having moreover a screw piece for kneading;

a solvent tank (25) connected to the first extruder;

a dryer (12) connected to the solvent tank;

a paraffin tank (26);

a mixer (14) connected to the paraffin tank (26) and connected to the dryer via a weighing machine (13);

a second extruder (19) connected to the mixer (14) and having a hopper (28) for introducing a thermoplastic resin, and a temperature raising mechanism, a pressure raising mechanism and a degassing mechanism, and moreover having a screw piece for kneading; and a mechanism (20) introducing a thermoplastic resin into the second extruder.

The present invention also provides a method for continuously producing a cellulose composite resin, the method including:

a first step of introducing a fine-powder cellulose fiber starting material (6) and a hydrophobizing chemical substance into a first extruder (4) having a temperature raising mechanism, a pressure raising mechanism and a degassing mechanism, and having a screw piece for kneading, melting the hydrophobizing chemical substance and kneading the hydrophobizing chemical substance and the cellulose, and further allowing the same to react, in order to yield chemically-modified cellulose;

a second step of discharging the chemically-modified cellulose from the first extruder (4), introducing the chemically-modified cellulose into a solvent tank (25) and dispersing the chemically-modified cellulose in an organic solvent, in order to yield a fluid dispersion, and thereafter injecting the fluid dispersion into a dryer (12) connected to the solvent tank (25), and drying the fluid dispersion, in order to separate the chemically-modified cellulose from the organic solvent; and a third step of mixing the dried chemically-modified cellulose with paraffin, and thereafter kneading the mixture and the thermoplastic resin by introducing the same into a second extruder having a temperature raising mechanism, a pressure raising mechanism and a degassing mechanism, and moreover having a screw piece for kneading.

The present invention further provides an apparatus for continuously producing a cellulose nanofiber composite separator for lithium ion batteries, the apparatus having a T die or a strand die connected to the above apparatus for continuously producing a cellulose composite resin, and provides a cellulose nanofiber composite separator for lithium ion batteries produced using the above apparatus for continuously producing a cellulose nanofiber composite separator for lithium ion batteries.

Advantageous Effects of Invention

Thus, the present invention allows for continuously producing cellulose having undergone chemical modification, for enhancing the dispersed state in a thermoplastic resin, allows for continuously performing removal of an unreacted hydrophobizing compound and a drying step, and allows for defibrating cellulose and compositing cellulose with a thermoplastic resin in a reactor.

The present invention makes it possible to continuously allow a dramatic increase in dispersibility and stability, with microfibrillation of a cellulose fiber starting material in a resin, as required during the production of a cellulose nanofiber-composited separator for lithium ion batteries through mixing of a resin and a cellulose in a cellulose fiber starting material that is abundant in nature.

DESCRIPTION OF EMBODIMENTS

The present invention provides a method for continuous production of chemically-modified cellulose, for continuously allowing for a dramatic increase in dispersibility and stability of a cellulose fiber starting material in a thermoplastic resin, as required during the production of a composited resin through mixing of a thermoplastic resin and cellulose in a cellulose fiber starting material that is abundant in nature. Further, the present invention provides a system for continuously producing a cellulose nanofiber composite separator for lithium ion batteries.

Preferred embodiments of the method for continuously producing chemically-modified cellulose, and of the system for continuously producing a cellulose nanofiber composite separator of the present invention, will be explained next with reference to the accompanying drawings.

Figure 1:
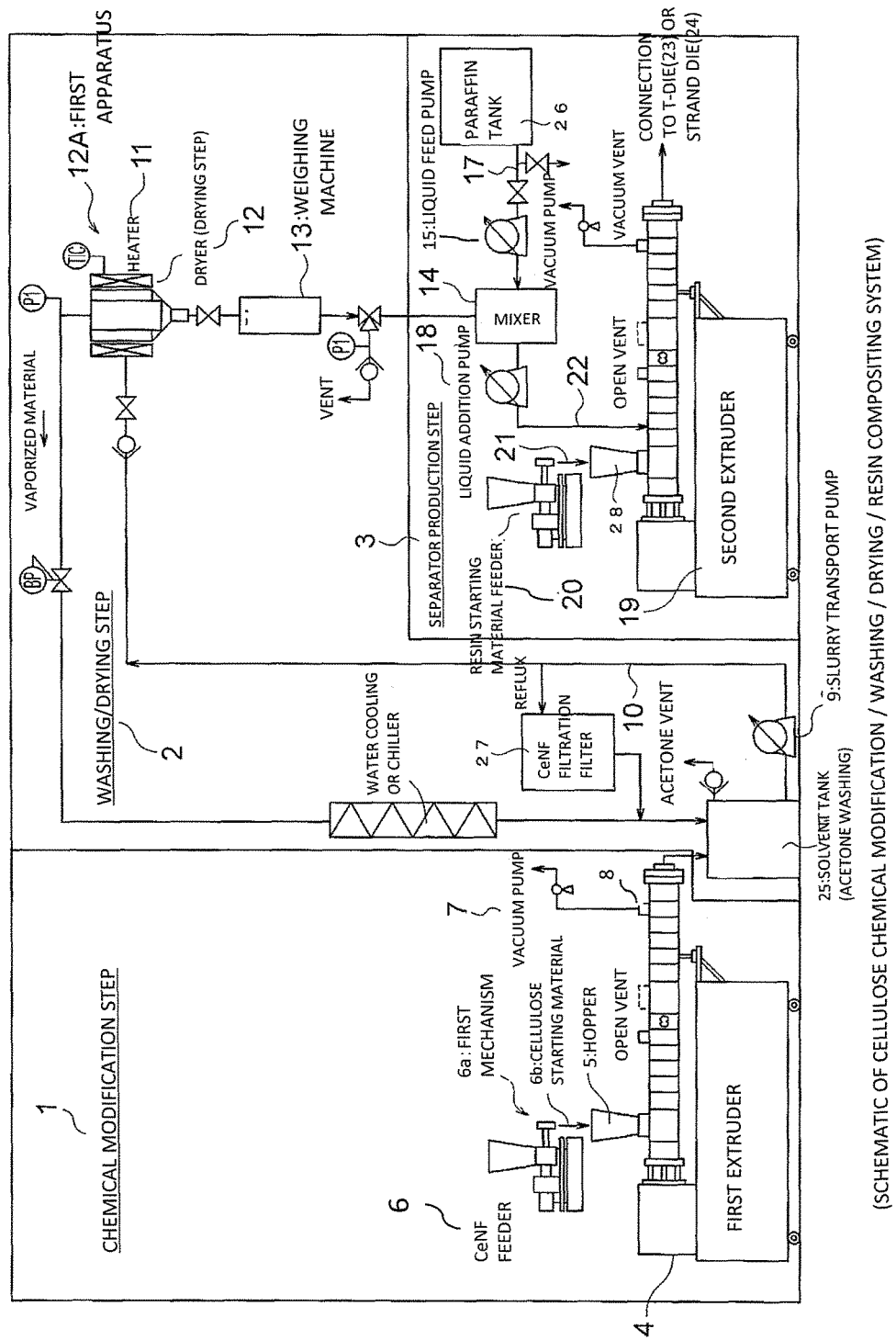
FIG. 1 is a schematic diagram of a cellulose chemical modification/washing/drying/resin compositing system.

In order to attain the above goals, in the present invention cellulose is first chemically modified, is washed and dried, is defibrated and is composited with a resin, using a system (apparatus: FIG. 1) that allows the three steps below to be performed.

An overview of the cellulose chemical modification/washing and drying/cellulose nanofiber composite separator production system of FIG. 1 will be described before the explanation on the first step to third step mentioned above.

FIG. 1 illustrates a schematic of a cellulose chemical modification/washing and drying/cellulose nanofiber composite separator production system of the present invention.

In FIG. 1 the reference symbol 1 denotes a chemical modification step, in which a cellulose starting material 6b and a hydrophobizing chemical substance that hydrophobizes cellulose are supplied via a feeder 6, as a first mechanism 6a, to a hopper 5 of a screw-type extruder 4; a substance for chemical modification is melt-kneaded under evacuation through a vacuum vent 8, using a vacuum pump 7, while being kneaded with cellulose nanofibers (CeNF). The surface of the cellulose molecules undergoes chemical modification as a result. Thereafter, any unreacted hydrophobizing chemical substance is washed out in a solvent tank 25 containing a solvent (for instance, acetone), after which a slurry (dispersion fluid) 10 containing fine-powder cellulose at a concentration of 1 to 60 mass % with respect to the fluid dispersion is fed to a slurry transport pump 9.

The slurry 10 fed from the slurry transport pump 9 is dried in a dryer 12 having a heater 11 being a first apparatus 12A of a washing/drying step 2, passes through a weighing machine 13, is stirred in a mixer 14 of a separator production step 3, with paraffin 17 from a paraffin tank 16 and that is fed by a liquid feed pump 15, and a given amount is fed to a second screw-type extruder 19 via a liquid addition pump 18.

A thermoplastic resin starting material 21 is fed at the same time from a mechanism 20 (for instance, a feeder) that introduces a thermoplastic resin starting material into the second screw-type extruder 19, is kneaded in the second screw-type extruder 19 together with the liquid starting material 22 containing the paraffin and the chemically-modified cellulose, from the liquid addition pump 18, and is fed to a T die 23 or a strand die 24, not shown.

(First Step)
Step of Obtaining Chemically-Modified Cellulose and Apparatus Used in this Step In the first step a fine-powder cellulose fiber starting material and a hydrophobizing chemical substance are mixed and allowed to react with each other.

Firstly, given amounts of a cellulose fiber starting material and of a hydrophobizing chemical substance are introduced to the feeder (6), to yield a mixture of the cellulose fiber starting material and the hydrophobizing chemical substance.

Next, the mixture of the cellulose fiber starting material and the hydrophobizing chemical substance is supplied from the feeder (6) to the hopper (5). The mixture is introduced to an apparatus (for instance, a twin screw extruder, a single screw extruder, a kneader or the like) having a function of enabling melt kneading. The mixture is kneaded in the apparatus, and the chemically-modified cellulose starting material is transported towards the front of the apparatus. The extruder used in this step has a temperature raising mechanism, a pressure raising mechanism and a degassing mechanism. The extruder herein is made up of a combination of two or more shapes from among a flight shape, a kneading shape and a torpedo shape, and is preferably a twin screw extruder having a screw piece with adjusted L/D (extruder cylinder inner diameter: D, screw piece length: L), and such that the kneading strength and the residence time within the extruder can be adjusted. Reaction time is equal to residence time in a case where a reaction process is carried out using an apparatus having transport capability. Accordingly, reaction time and kneading strength can be regulated by recombining pieces of various screw shapes in accordance with the target residence time of cellulose within the apparatus. In particular, a torpedo results herein in weak shear stress on the cylinder inner wall, and is accordingly effective when it comes to prolonging residence time without excessive kneading. Reaction temperature and pressure are adjusted depending on the chemical modification state of the cellulose.

In the present invention, a fine-powder cellulose fiber starting material is used. Preferably, the fine-powder cellulose fiber starting material has an average particle size d in a range of 1 nm to 150 μm. Such a cellulose fiber starting material is commercially available and examples thereof include, for instance, Ceolus FD 101 (by Asahi Kasei Chemicals Corporation), Celish (by Daicel Corporation), KC Flock W-400G (by Nippon Paper Industries Co., Ltd.), and the like.

The average particle size is measured specifically in accordance with the method below. Ordinarily average particle size is measured, for instance, by dynamic light scattering based on fluctuations of light scattering intensity, by laser diffraction based on diffraction scattering patterns, or by centrifugal sedimentation in which after immersion of a powder in a solvent, the amount of light transmitted by a sample having settled on account of centrifugal forces is measured. Herein average particle size was measured using a scanning electronic microscope (SUPRA 55VP by Carl Zeiss AG). In the scanning electronic microscope, the surface of cellulose particles is scanned by an electron beam, and secondary electrons generated at the irradiation position are captured, to obtain thereby an image on the basis of which particle size is measured. To measure average particle size, respective particle sizes were measured from images acquired under conditions of acceleration voltage of 3 kV and measurement magnification of 10,000×. Average particle size was calculated from about 200 or more views obtained randomly.

Acids capable of reacting with the hydroxyl groups of cellulose can be used herein as the hydrophobizing chemical substance for chemical modification that are utilized in the present process, with carboxylic acid-based compounds being preferred herein. Examples of carboxylic acid-based compounds include, for instance, compounds having one carboxyl group, compounds having two carboxyl groups, as well as acid anhydrides of compounds having two carboxyl groups or derivatives thereof. Preferred among these carboxylic acid-based compounds are compounds having two carboxyl groups (dicarboxylic acid compounds).

Examples of compounds having one carboxyl group include, for instance, formic acid, acetic acid, propionic acid, butyric acid, benzoic acid and the like.

Examples of compounds having two carboxyl groups include for instance dicarboxylic acid compounds such as propanedioic acid (malonic acid), butanedioic acid (succinic acid), pentanedioic acid (glutaric acid), hexanedioic acid (adipic acid), 2-methylpropanedioic acid, 2-methylbutanedioic acid, 2-methylpentanedioic acid, 1,2-cyclohexanedicarboxylic acid, 2-butenedioic acid (maleic acid, fumaric acid), 2-heptenedioic acid, 2,4-hexadienedioic acid, 2-methyl-2-butenedioic acid, 2-methyl-2-pentenedioic acid, 2-methylidenebutanedioic acid (itaconic acid), benzene-1,2-dicarboxylic acid (phthalic acid), benzene-1,3-dicarboxylic acid (isophthalic acid), benzene-1,4-dicarboxylic acid (terephthalic acid), ethanedioic acid (oxalic acid) and the like.

Examples of compounds of acid anhydrides having two carboxyl groups include, for instance, acid anhydrides of dicarboxylic acid compounds such as maleic anhydride, succinic anhydride, phthalic anhydride, glutaric anhydride, adipic anhydride, itaconic anhydride, pyromellitic anhydride, 1,2-cyclohexane dicarboxylic anhydride or the like, or acid anhydrides of compounds having a plurality of carboxyl groups.

Examples of derivatives of acid anhydrides of compounds having two carboxyl groups include, for instance, derivatives in which at least some hydrogen atoms of an acid anhydride of a compound having a carboxyl group is substituted with a substituent (for instance, an alkyl group, and a phenyl group), such as dimethyl maleic anhydride, diethyl maleic anhydride, diphenyl maleic anhydride or the like.

Preferred among the foregoing are maleic anhydride, succinic anhydride and phthalic anhydride, since these are easy to use industrially and are readily gasified.

In the present invention the above hydrophobizing chemical substances may be used in combination, and a pigment or the like may also be used as needed.

The temperature of the apparatus is regulated so that the reaction temperature is equal to or higher than the melting point of the substance for chemical modification. The process temperature is 100° C. or higher, preferably 120° C. or higher, in terms of reactivity between cellulose and the hydrophobizing chemical substance. The process temperature is 250° C. or lower, preferably 200° C. or lower, from the viewpoint of the thermal decomposition temperature of cellulose. Accordingly, the process temperature may lie ordinarily at 100° C. to 250° C., preferably 120° C. to 250° C., and more preferably 120° C. to 200° C.

The addition amount of the hydrophobizing chemical substance is not particularly limited, but ranges ordinarily from 0.5 parts by mass to 30 parts by mass, preferably 1.5 parts by mass to 20 parts by mass, with respect to 100 parts by mass of the fine-powder cellulose fiber starting material.

The inner face of the reaction apparatus may be coated with various kinds of metal plating in order to impart resistance against corrosion by such substances. Even in a microfibril state (micron-sized powder before defibration), the chemically-modified cellulose obtained in the present invention can be made to sufficiently disperse in a separator for lithium ion batteries, and can be easily brought to a cellulose nanofiber state.

(Second Step)
Step of Washing and Drying Unreacted Hydrophobizing Chemical Substance, and Apparatus Used in this Step The cellulose having been chemically modified in the first step is discharged out of the leading end of the reaction apparatus (first extruder 4 in FIG. 1) and is charged into an organic solvent, to obtain chemically-modified cellulose. The concentration of cellulose in the fluid dispersion is preferably 1 mass % to 60 mass %, and more preferably 2 mass % to 40 mass %.

As the organic solvent there can be used known solvents such as acetone, ethyl methyl ketone, pentane, hexane, heptane, cyclohexane, benzene, diethyl ether and the like, preferably acetone.

The unreacted hydrophobizing substance migrates to the organic solvent, and the chemically-modified cellulose is washed.

Next, the cellulose fluid dispersion after chemical modification is injected to the dryer using, for instance, a liquid feed pump. Preferred examples of the dryer include, for instance, medium fluid dryers, drum dryers, thin-film evaporators, spray dryers, single screw extruders, twin screw extruders and the like. Two or more types of the foregoing may be used concomitantly. Preferred herein is an apparatus having a temperature raising mechanism, and more preferably an apparatus having a vacuum mechanism, to enable efficient drying of the organic solvent. A distillation apparatus, a condenser or the like for recovery of organic solvent volatilized using the dryer may be attached to the apparatus. The various components used in a drying unit of the apparatus preferably comply with explosion-proof specifications. The unreacted hydrophobizing chemical substance as well volatilizes during volatilization of the organic solvent.

The drying time is adjusted, for instance, depending on the drying temperature, the concentration of cellulose in the fluid dispersion and the fluid dispersion amount, but is ordinarily 1 to 30 minutes, preferably 1 to 15 minutes, more preferably 1 to 10 minutes, yet more preferably 1 to 5 minutes, and even yet more preferably 1 to 2 minutes.

A plurality of reaction apparatuses and washer/dryers may be combined in a case where cellulose is to undergo secondary chemical modification.

The amount injected into the dryer (12) must be adjusted at the initial stage of production. To that end, part of the fluid dispersion (slurry) fed out of the solvent tank (25) is returned to the solvent tank (25) before reaching the dryer (12). However, the fluid dispersion contains chemically-modified cellulose, and hence is filtered using a CeNF filtration filter (27), whereby only the solvent is returned to the solvent tank (25). This allows preventing emptying of solvent from the solvent tank (25).

(Third Step)
Cellulose Nanofiber-Composited Separator Production Step and Apparatus Used in this Step Next, the chemically-modified cellulose obtained in the above method moves on to the mixer (14) via the weighing machine (13). In the mixer (14), the chemically-modified cellulose is dispersed in liquid paraffin (17) fed from the paraffin tank (26), to yield a slurry (fluid dispersion). The concentration of cellulose with respect to liquid paraffin is preferably 0.1 mass % to 40 mass %, more preferably 0.1 mass % to 30 mass %.

The slurry is mixed with a thermoplastic resin, to yield a cellulose composite resin. To mold a composite of the chemically-modified cellulose, the thermoplastic resin and the paraffin, specifically, kneading is accomplished using an apparatus (second extruder (19)) (for instance, a twin screw extruder, a single screw extruder or a kneader) having a hopper (28) and a liquid addition pump that allow introducing the slurry and the thermoplastic resin into a reactor for mixing of the slurry and the thermoplastic resin, the apparatus having functions of enabling temperature raising, pressure raising and degassing to bring about conditions under which the thermoplastic resin can be melted and be kneaded with the chemically-modified powdery or microfibrillated cellulose. Herein one, two or more screw shapes from among a flight shape, a kneading shape and a gear shape are combined, and L/D is optimized. The gear shape in particular is important in terms of enhancing the dispersion effect of the cellulose starting material in the thermoplastic resin.

The concentration of the thermoplastic resin is preferably 10 mass % to 50 mass %, and more preferably 20 mass % to 40 mass %, with respect to the slurry.

The thermoplastic resin that can be used in the present invention is not particularly limited, so long as the resin can be used as a material of separators for lithium ion batteries. Specific examples include, for instance, polyolefins such as polyethylene and polypropylene, as well as polyvinylidene fluoride, ethylene-vinyl alcohol copolymers, polyamide, polyether imide, polystyrene, polysulfone, polyvinyl alcohol, polyphenylene ether, polyphenylene sulfide, cellulose acetate, polyacrylonitrile and the like. Preferred among the foregoing are polyolefins, for instance polymers (homopolymers, copolymers or the like) obtained through polymerization of monomers such as ethylene, propylene, 1-butene, 4-methyl-1-pentene, 1-hexene, 1-octene or the like. The foregoing can be used singly or in combinations of two or more types.

After production of the cellulose composite resin, an attachment such as a T die used in sheet molding or a strand die for producing pellets is mounted on the leading end of the apparatus, to thereby yield a sheet molding device of a wet-type separator production apparatus. Herein the T die may be not just of a single-layer type but also of a multilayer type, for the purpose of layering with different materials. Layering of the resin in the case of a multilayer configuration can be of a feed block type or a manifold type. There may be a mechanism for mounting such other general-purpose attachments.

EXAMPLES

Embodiments of the present invention will be explained below with reference to the accompanying drawings.

Example 1

FIG. 1 illustrates one example of the system having the first to third steps described above. A separator for lithium ion batteries (LIB) was produced using the cellulose chemical modification/washing and drying/composite resin production system of FIG. 1. In terms of production conditions, the chemical modification illustrated in the first step was conducted with succinic anhydride under (Condition 1) to (Condition 4) below, and differences in acid value, for measuring the degree of chemical modification, were worked out. Separators were produced by modifying, to Conditions 1 to 5, the dry state of the cellulose after washing of the unreacted hydrophobizing chemical substance, illustrated in the second step.

Figure 2:
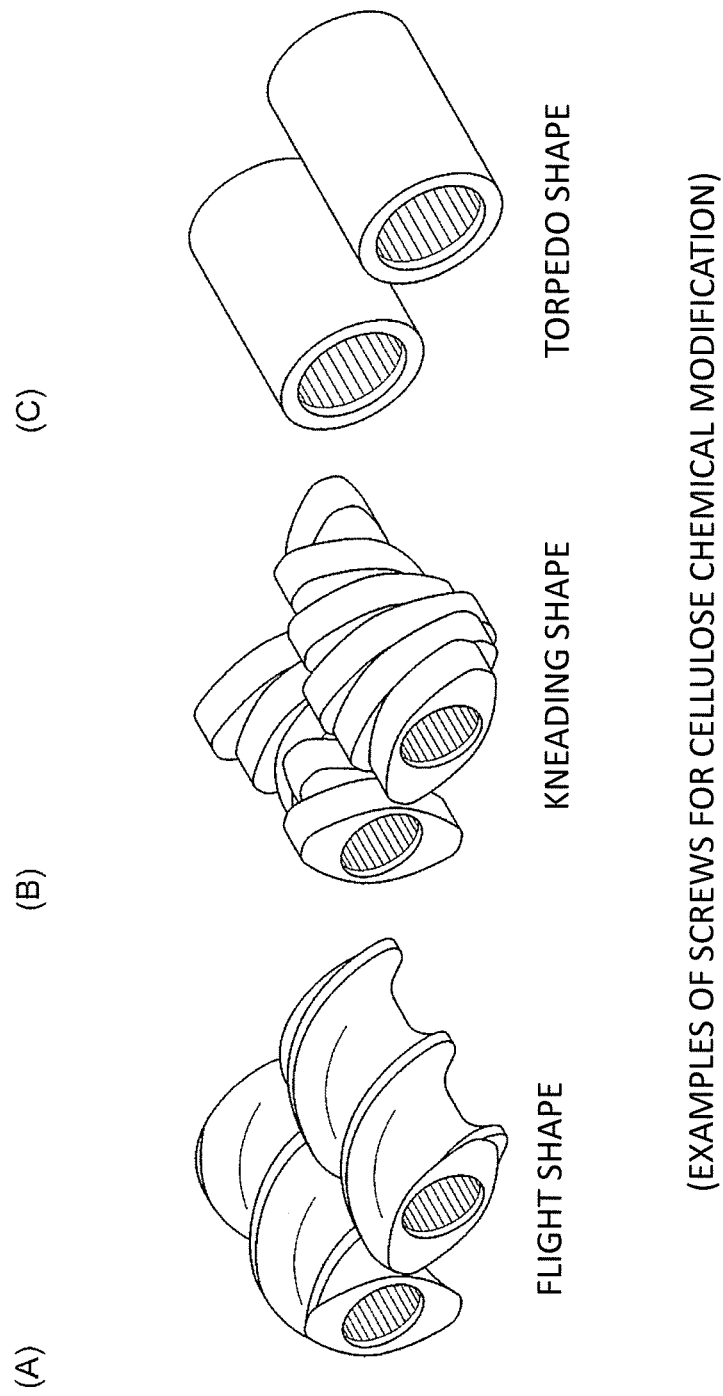
FIG. 2 is a set of perspective-view diagrams of examples of a screw for cellulose chemical modification.

Firstly, chemically-modified cellulose was obtained by reacting a cellulose fiber starting material (Ceolus FD 101 by Asahi Kasei Chemicals Corporation, average particle size 50 μm) and succinic anhydride (by Tokyo Chemical Industry Co., Ltd.), at a ratio of 95.5:4.5, in a twin screw extruder (TEX30, by Japan Steel Works, Ltd., first extruder (4) of FIG. 1) illustrated in the first step. The screws in the twin screw extruder are made up of a screw arrangement of flight shapes, kneading shapes and torpedo shapes with optimized L/D, such as those illustrated in FIG. 2. The reaction temperature herein lies in a range of 100° C. to 150° C.

Figure 4:
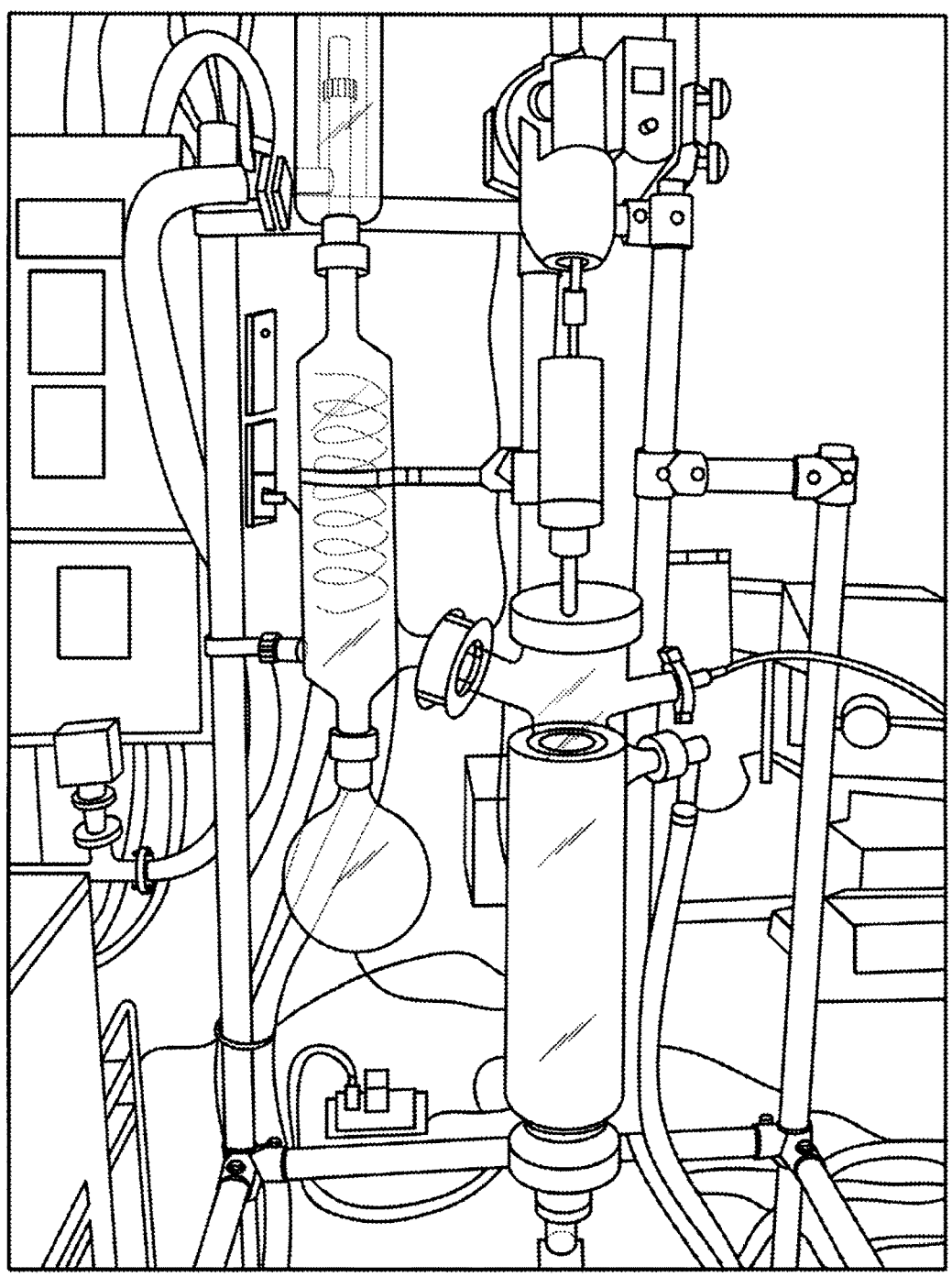
FIG. 4 is a configuration diagram of a thin-film evaporator used for drying of cellulose having undergone solvent washing.

Next, a pipe was connected to the leading end of the twin screw extruder, as illustrated in the second step, and was placed in acetone as the solvent (30 mass % of cellulose with respect to the fluid dispersion). In order to prevent precipitation, the cellulose was injected into a thin-film evaporator 30 (by Asahi Glassplant Inc., corresponding to the dryer 12 of FIG. 1) illustrated in FIG. 4, by way of a liquid feed pump, under stirring at a rotational speed of 180 rpm. The temperature inside the thin-film evaporator 30 was set to 120° C., such that the drying time was 2 minutes, and the rotational speed of a thin-film forming wiper was adjusted. The dried cellulose was recovered at the bottom of the apparatus, and the dry state of the cellulose was evaluated. The acetone generated in the drying step was cooled in a condenser having a refrigerant at −10° C. circulating therethrough, and was recovered in a liquid state.

Figure 3:
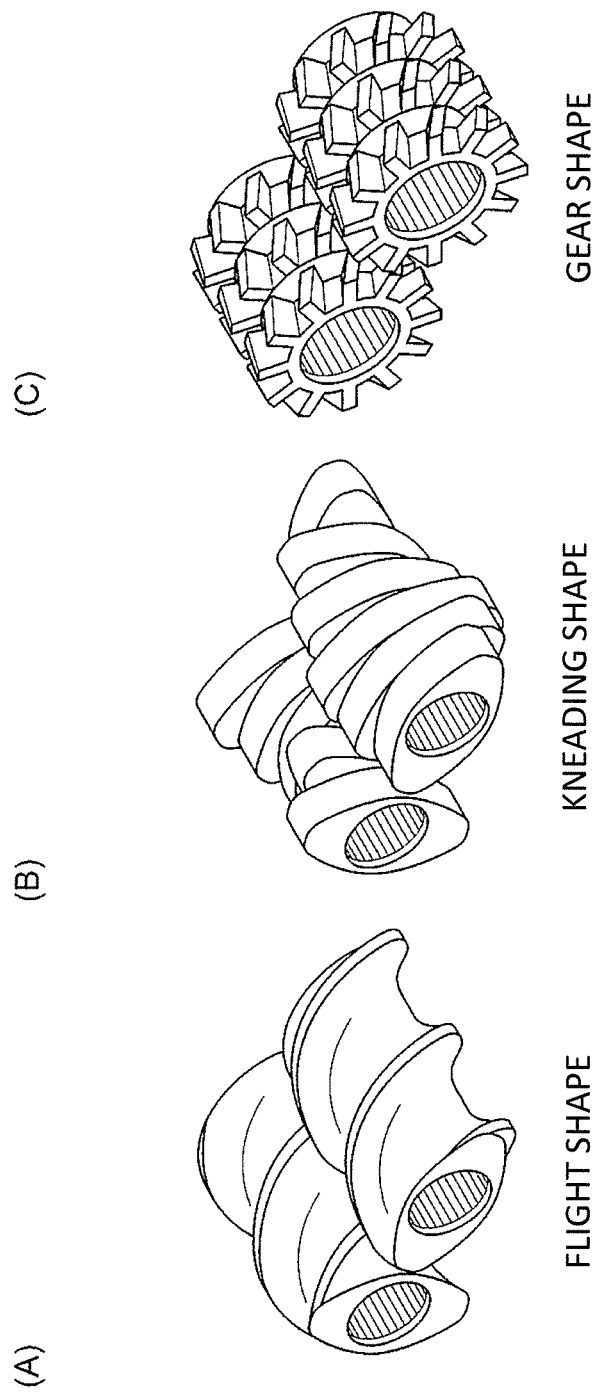
FIG. 3 is a set of perspective-view diagrams of examples of a screw for compounding of chemically-modified cellulose and a resin.
Figure 5:
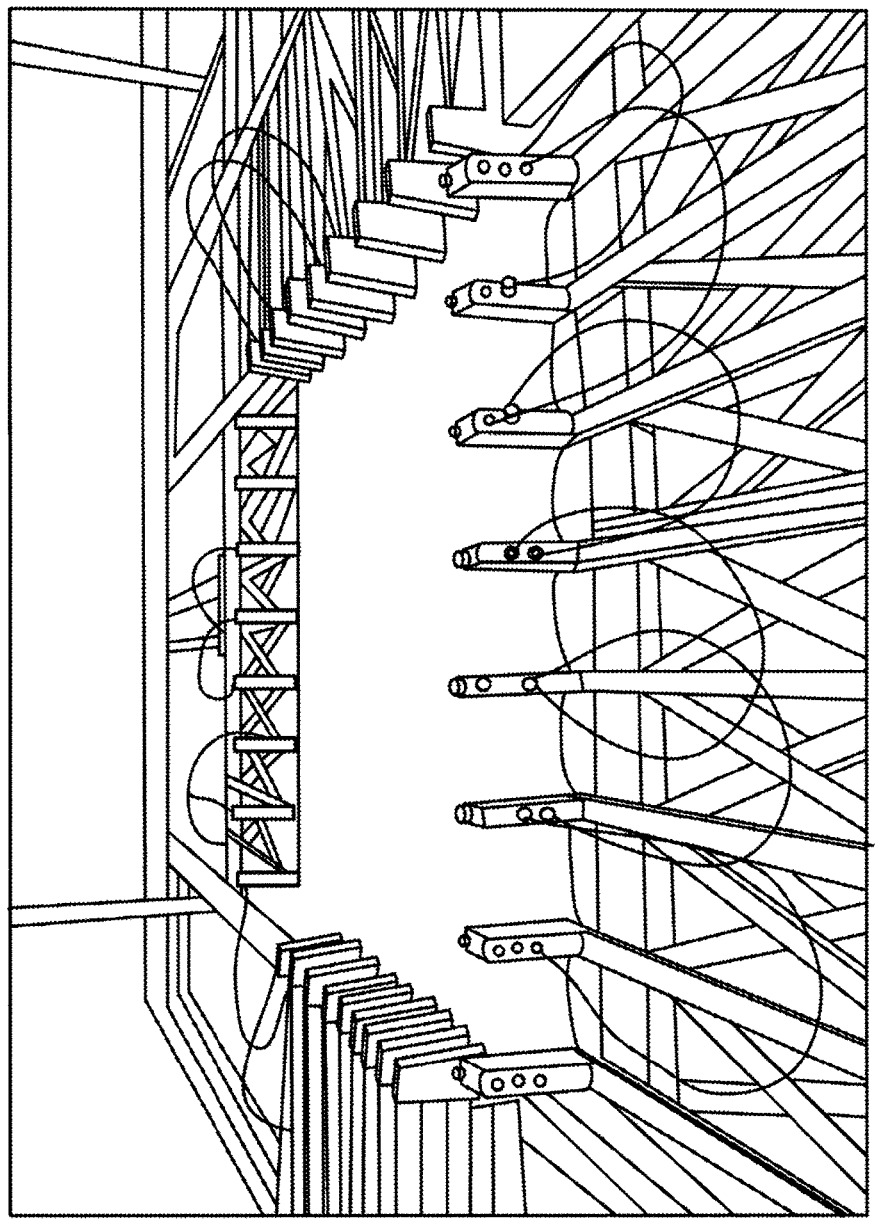
FIG. 5 is an external-view diagram of a table center used for stretching of a film sheet.
Figure 6:
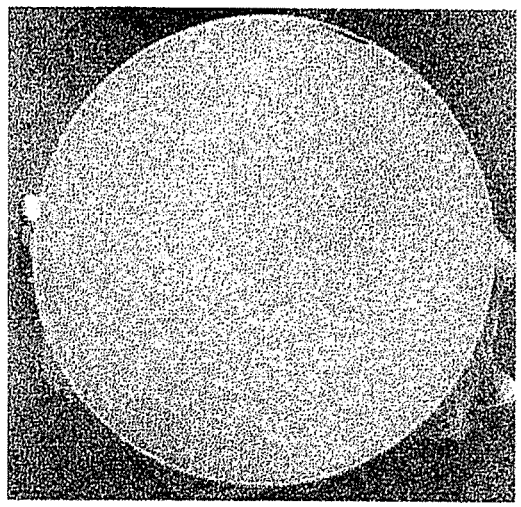
FIG. 6 is an explanatory diagram illustrating a method of degreasing of a film sheet.
Figure 6:
Figure 6:
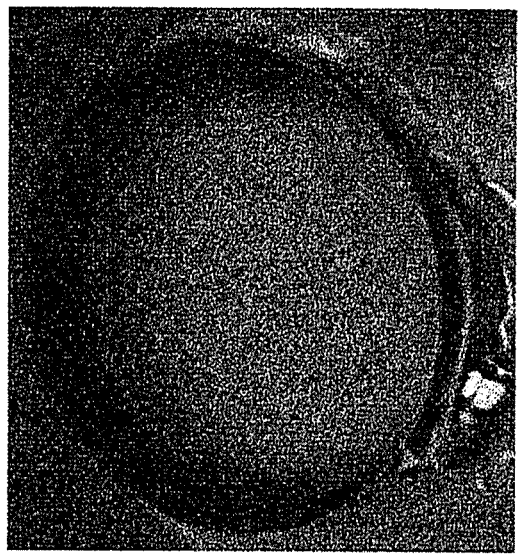

Lastly, as illustrated in the third step, the obtained chemically-modified cellulose powder was added to liquid paraffin (P-350P by MORESCO Corporation) (1 mass % of cellulose with respect to liquid paraffin); the whole was injected into a twin screw extruder (second extruder 19) using a liquid addition pump, and was kneaded with ultrahigh molecular weight polyethylene (Hi-Zex 030S by Mitsui Chemicals, Inc., resin concentration 30 mass % with respect to the slurry of the liquid paraffin plus the chemically-modified cellulose), with molding to a sheet shape through extrusion using a T die 23. The screws of the twin screw extruder (second extruder 19) that was used herein were a combination of at least two of a flight shape, a kneading shape and a gear shape with optimally adjusted L/D, illustrated in FIG. 3. The sheet having been cast-molded through extrusion from the T die was stretched 6-fold in the machine direction (MD) and 7-fold in the transverse direction (TD), in the table tenter apparatus 31 (by Toyo Seiki Co., Ltd.) illustrated in FIG. 5, to yield a film having a thickness of 10 µm. In order to remove liquid paraffin in the film, the sample was fixed to a Ø100 fixture, as illustrated in FIG. 6, and degreasing was performed using dichloromethane, to produce a separator for LIBs. The sheet was transparent before degreasing (left picture), but exhibited white turbidity after degreasing (right picture). Except for the screws, the first extruder 4 and the second extruder 19 had the same structure and function.

The acid value denoting the degree of chemical modification of the obtained chemically-modified cellulose was measured in accordance with an acid value measurement method (JIS K2501) ordinarily resorted to. The acid value is defined as the number of mg of potassium hydroxide necessary to neutralize an acidic substance contained in 1 g of sample. The acid value denotes the amount of succinic anhydride that becomes added to the cellulose surface, such that the higher the value, the greater can be deemed to be the hydrophobicity denoted thereby. In the measurements, first 1 g of cellulose for evaluation was weighed in a 100 mL beaker, and 10 mL each of distilled water and acetone were added, with stirring at 400 rpm for 10 minutes using a magnetic stirrer. To measure the acid value, the resulting mixed solution was titrated, while being stirred at 200 rpm, using a 0.1 N ethanol solution of KOH.

Various characteristic values of the separator were calculated in accordance with the method illustrated below, and were checked, as a system, by comparing the calculated values with the characteristics of a separator produced in a batch system, illustrated in Comparative example 1.

Heat shrinkage factor: each produced sheet was cut to a 50 mm×50 mm square, and thereafter the cut sheet was placed in an oven at 100° C. and at 120° C. One hour later, the sheet was taken out of the oven, and the changes in dimensions from before to after being allowed to stand in the oven were measured.

Tensile strength: each produced sheet was cut to a dumbbell shape, and was stretched at a test speed of 50 mm/min until breakage of the sheet, using a tensile tester (AG100N by Shimadzu Corporation). The tensile strength was the maximum load until breakage.

Air permeability: each produced film was cut to a 50 mm×50 mm square, after which the time elapsed until passage of 100 cc of air was measured using an air permeability meter (by TESTING MACHINES, INC.) according to JIS K.

Puncture strength: each produced film was cut to a 50 mm×50 mm square, after which the strength until breakage of the film was measured using a puncture strength meter (KES-G5 by Kato Tech Co., Ltd.) according to JIS K. Puncture strength was worked out as the average value of measurements at 10 sites of each sample.

Surface observation: platinum was vapor-deposited to a thickness of 0.3 nm on the produced sheet, using a vacuum deposition apparatus (E-1045 by Hitachi High-Technologies Corporation). The surface of the sheet was observed using a FE-SEM (SUPRA 55VP by Carl Zeiss AG).

Dispersion state: since cellulose has oxygen in the molecular structure, the dispersed state of cellulose in a film was evaluated through oxygen mapping by EDX (AZtec-Energy by Oxford Instruments plc.).

(Condition 1)

Drying was performed by setting the temperature in the thin-film evaporator to 120° C., in the drying step of Example 1. Other conditions were identical to those of Example 1.

(Condition 2)

Drying was performed by setting the temperature in the thin-film evaporator to 100° C., in the drying step of Example 1. Other conditions were identical to those of Example 1.

(Condition 3)

Drying was performed by setting the temperature in the thin-film evaporator to 80° C., and by setting the drying time to 5 minutes, in the drying step of Example 1. Other conditions were identical to those of Example 1.

(Condition 4)

Drying was performed by setting the temperature in the thin-film evaporator to 120° C., and setting the drying time to 1 minute, in the drying step of Example 1. Other conditions were identical to those of Example 1.

(Condition 5)

Drying was performed by setting the temperature in the thin-film evaporator to 130° C., and setting the drying time to 1 minute, in the drying step of Example 1. Other conditions were identical to those of Example 1.

Figure 10:
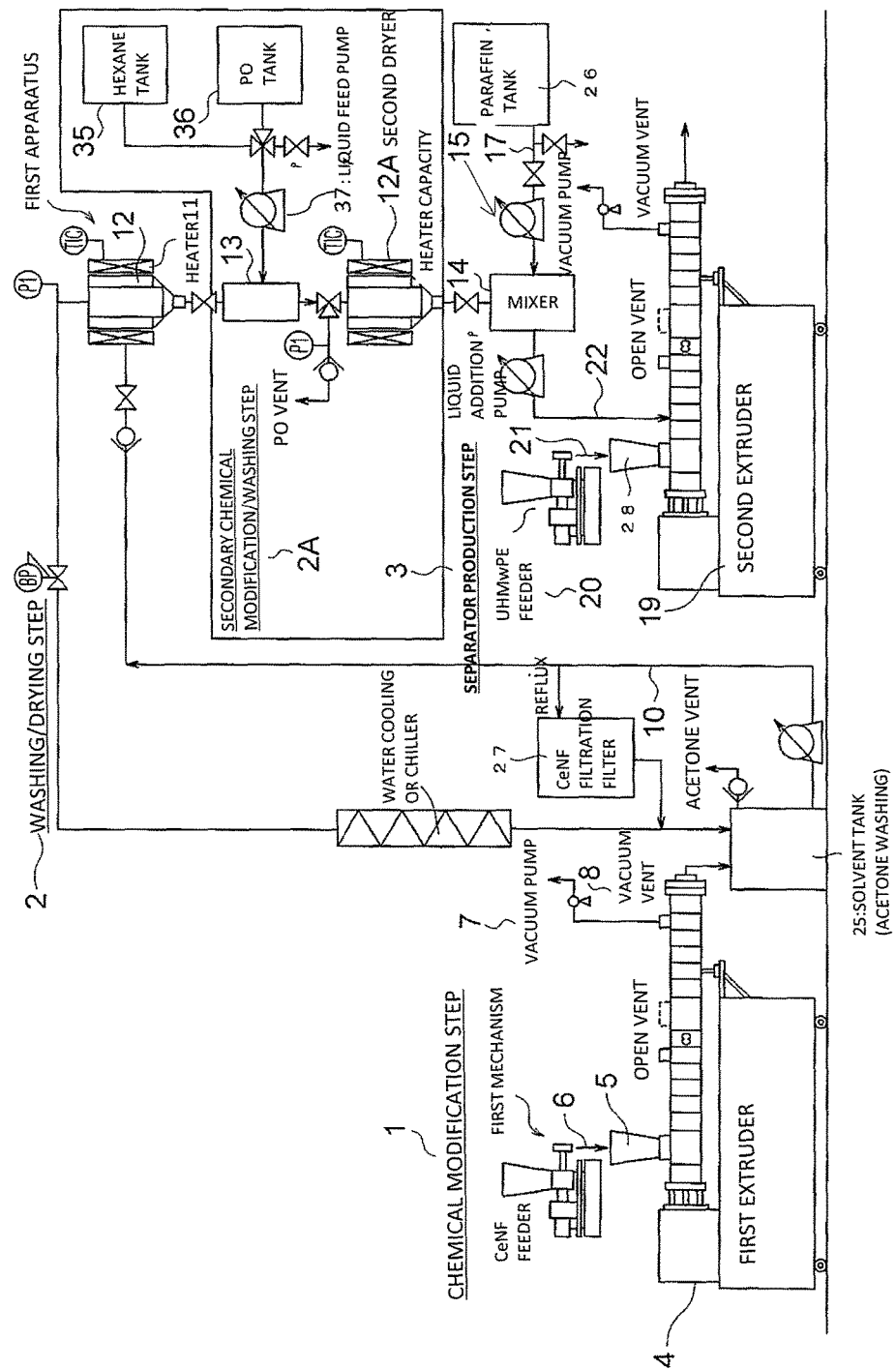
FIG. 10 is a schematic view illustrating another implementation of FIG. 1.

Example 2 of the present invention will be explained next. As illustrated in FIG. 10, the characterizing feature of the system of Example 2 is the addition of a secondary chemical modification/washing step 2A subsequent to the washing/drying step 2 of the system of FIG. 1 described above. Herein a second dryer 12A was provided between the weighing machine 13 and a mixer 14; further a hexane tank 35 and a PO tank 36 were connected to the weighing machine 13 via a liquid feed pump 37.

Example 2

A secondary chemical modification/washing step 2A of FIG. 10 may be carried out, in the system, after the second step of Example 1 in FIG. 1. It is found that in order to further enhance dispersibility and stability of nanocellulose fibers in various resins it is effective herein to further perform chemical modification using propylene oxide (PO), after washing and drying of the cellulose starting material having undergone a chemical modification process with succinic anhydride. FIG. 10 illustrates an example of a system which, to allow conducting secondary chemical modification, has a reaction vessel provided with equipment enabling regulation of temperature and pressure, a weighing machine and valves that allow supplying a given amount of CeNF having undergone primary modification, and a mechanism that allows supplying, into the reactor, PO optimally corresponding to the supply amount of CeNF. Physical property values involved in the production of the separator in this system are summarized in Table 1.

TABLE 1

Analysis results

| | Air permeability (sec/100 cc) | Puncture strength (gf) | Tensile strength (MD/TD) (MPa) | Heat shrinkage factor (MD/TD) (%) |
|---|---|---|---|---|
| Example 1 Condition 1 | 561.4 | 978.1 | 162/177 | 12.9/15.7 |
| Example 1 Condition 2 | — | — | — | — |
| Example 1 Condition 3 | 551.2 | 959.5 | 156/180 | 13.1/15.2 |
| Example 1 Condition 4 | — | — | — | — |
| Example 1 Condition 5 | 553.1 | 966.1 | 159/171 | 13.5/16.1 |
| Example 2 | 430.1 | 969.4 | 155/173 | 14.1/15.2 |
| Comparative example | 536.4 | 798.2 | 156/166 | 13.2/14.8 |

Comparative Example

Figure 11:
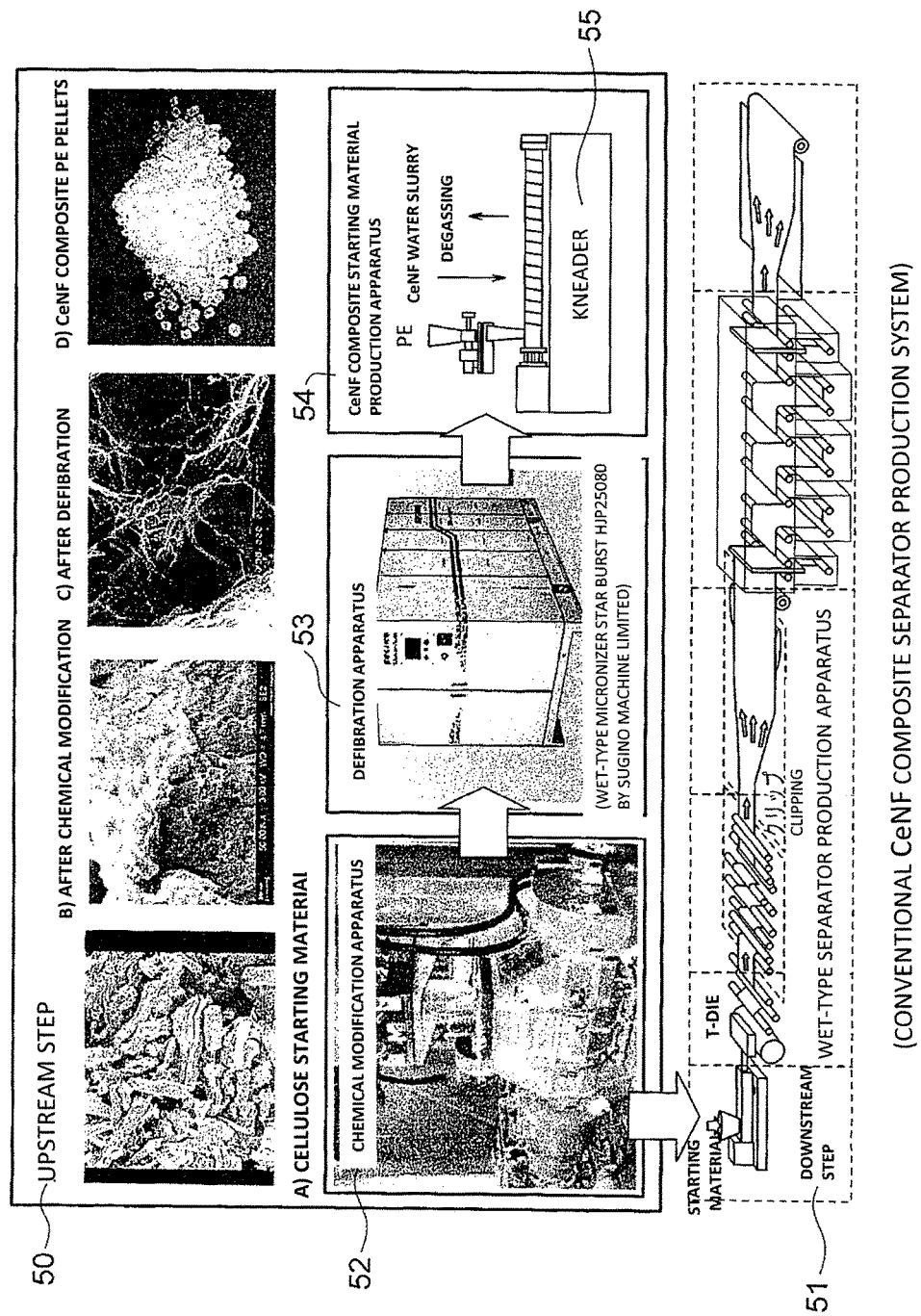
FIG. 11 is an explanatory diagram illustrating Comparative example 1 of the present invention.

FIG. 11 illustrates a conventional CeNF composite separator production system. This system is divided into an upstream step 50 and a downstream step 51, such that in the upstream step 50, succinic anhydride and a cellulose starting material in state A) are mixed at a ratio by weight of 45:95.5, inside a chemical modification apparatus 52 having a pressure kneader, and are kneaded at 125° C. for 20 minutes, after which a cellulose starting material in state B) is obtained. Thereafter unreacted product was removed using acetone, to prepare a water suspension containing 5 mass % of cellulose. Next, the suspension was subjected to an ultra-high pressure head-on impingement process using Star Burst (HJP25080 by Sugino Machine Limited), being a defibration apparatus 53, to yield nanofibers in state C). Thereafter, the CeNF water suspension was kneaded with ultrahigh molecular weight polyethylene (Hi-Zex Million 030S by Mitsui Chemicals, Inc.) in a kneader (twin screw extruder) 55 (TEX 30) being a CeNF composite starting material production apparatus 54, to produce thereby cellulose nanofiber composited pellets in state D). The pellets were made into a film in the downstream step illustrated in the separator production step 3 of Example 1. Physical property values involved in the production of a separator in this system are summarized in Table 1.

Result Comparison

Table 2 sets out acid values upon changing of the chemical modification condition of Example 1 to 1 through 4. The acid value upon modification of the cylinder temperature condition becomes about 17 mg/g, i.e. that of a low hydrophobization state. Other conditions yielded 35 mg/g or more, and a composited state comparable to or better than that of Condition 1. Next, Table 3 illustrates dry states under conditions pertaining to Conditions 1 to 5, after acetone-washing of the chemically-modified cellulose starting material obtained according to Condition 3 in Table 2. Cellulose exhibited a satisfactory dry state under Condition 1. Cellulose in a moist state was obtained under Condition 2, which involved a drying temperature of 100° C. and a drying time of 1 minute. Dried cellulose was obtained under Condition 3, where the drying temperature was set to 80° C. and drying time to 5 minutes. The dry state of cellulose was insufficient under Condition 4, where the drying temperature was set to 120° C. and the drying time to 1 minute. Dried cellulose was obtained under Condition 5, where the drying temperature was set to 130° C. and drying time to 1 minute. The optimal drying temperature was set to 60° C. to 180° C., since cellulose does not dry off at a drying temperature of 60° C., while at 180° C. cellulose exhibits a yellowish hue, and succinic anhydride is apt to decompose.

TABLE 2

| No. | Cylinder temperature (° C.) | Residence time (min) | Succinic anhydride addition amount (%) | Acid value (mg/g) |
|---|---|---|---|---|
| 1 | 140 | 12 | 4.5 | 36.6 |
| 2 | 115 | 12 | 4.5 | 17.6 |
| 3 | 140 | 7 | 4.5 | 35.7 |
| 4 | 140 | 12 | 13.5 | 59.5 |

TABLE 3

Evaluation results of cellulose dry state

| Condition | Drying temperature (° C.) | Drying time (min) | Dry state (—) |
|---|---|---|---|
| Condition 1 | 120 | 2 | ○ |
| Condition 2 | 100 | 2 | X |
| Condition 3 | 80 | 5 | ○ |
| Condition 4 | 120 | 1 | Δ |
| Condition 5 | 130 | 1 | ○ |

Figure 7:
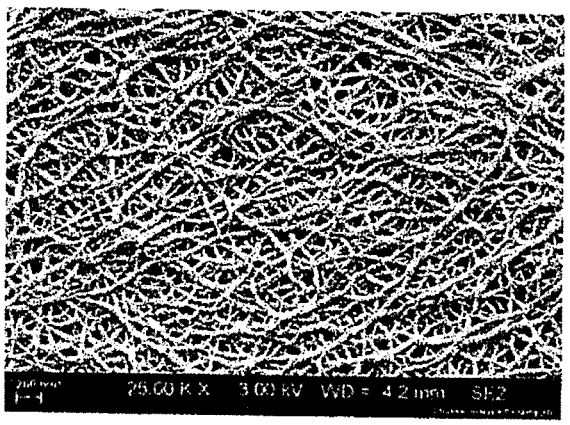
FIG. 7 are SEM observation results in Example 1.
Figure 8:
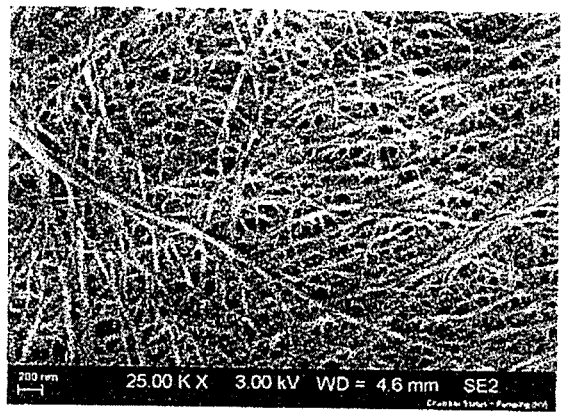
FIG. 8 are SEM observation results in Example 2.
Figure 9:
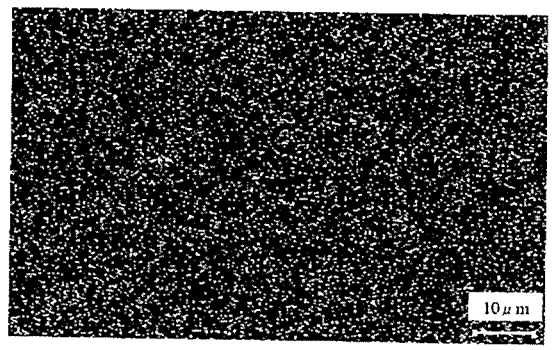
FIG. 9 illustrates EDX analysis results in Example 1.

FIG. 7 and FIG. 8 illustrate SEM micrographs of separator films produced under Condition 1 in Example 1, and in Example 2. FIG. 9 illustrates oxygen mapping results, by EDX, of the film of Example 1 under Condition 1. The analysis results of FIG. 9 reveal that oxygen, being present in cellulose molecules denoted by the bright spots but not present in polyethylene molecules, is distributed evenly. Accordingly, it is deemed that the cellulose in the resin is distributed uniformly.

Table 1 above illustrates measurement results of separator characteristics (air permeability, puncture strength and heat shrinkage factor) in Example 1, Example 2 and the Comparative example.

Conditions in Example 1 are good, and thus the dry state in Table 2 described above is denoted by a circle (○). A comparison between the separator resulting from compositing the continuously obtained chemically-modified cellulose and a thermoplastic resin, and the composite separator of a resin and nanofibrillated cellulose obtained through the process with Star Burst illustrated in the Comparative example, revealed that the separators exhibited substantially identical characteristics. All the above indicates that through the use of the system for continuously producing chemically-modified cellulose of the present invention it becomes possible to dispense with a defibration apparatus conventionally used in batches, and to dispense with a process and apparatus for obtaining a starting material in the form of pellets resulting from compositing of cellulose and a resin, and it becomes possible to obtain an apparatus that allows completing, in a series of systems, nanofibrillation of cellulose as a result of a chemical modification process and defibration in an extruder.

INDUSTRIAL APPLICABILITY

The present invention makes it possible to continuously allow for a dramatic increase in dispersibility and stability of a cellulose fiber starting material in a thermoplastic resin, as required during the production of a composited resin through mixing of a resin and cellulose abundant in nature, and allows defibrating cellulose and compositing cellulose with a thermoplastic resin inside a reactor.

REFERENCE SIGNS LIST

1 Chemical modification step
2 Washing/drying step
2A Secondary chemical modification/washing step
3 Separator production step
4 First extruder
4a First mechanism
5 Hopper
6 Cellulose
7 Vacuum pump
8 Vacuum vent
9 Slurry transport pump
10 Slurry
11 Heater
12 Dryer (drying step)
12A First apparatus
13 Weighing machine
14 Mixer
15 Liquid feed pump
17 Paraffin
18 Liquid addition pump
19 Second extruder
20 Mechanism 20 (feeder) for introducing a thermoplastic resin starting material
21 Thermoplastic resin starting material
22 Liquid starting material
23 T die
24 Strand die
25 Solvent tank
26 Paraffin tank
27 CeNF filtration filter
28 Hopper
30 Thin-film evaporator
31 Table tenter apparatus
35 Hexane tank
36 PO tank
50 Upstream step
51 Downstream step
52 Chemical modification apparatus
53 Defibration apparatus
54 CeNF composite starting material production apparatus
55 Kneader

The invention claimed is:
1. An apparatus for continuously producing chemically-modified cellulose, comprising:
a first mechanism for transporting a fine-powder cellulose fiber starting material and a hydrophobizing chemical substance;
an extruder having a hopper for introducing the cellulose fiber starting material and the hydrophobizing chemical substance, and having a temperature raising mechanism, a pressure raising mechanism and a degassing mechanism, and moreover having a screw piece for kneading;
a solvent tank connected to the extruder; and
a dryer connected to the solvent tank.
2. The apparatus according to claim 1, wherein an average particle size d of the fine-powder cellulose fiber starting material is 1 nm≤d≤150 μm.
3. The apparatus for continuously producing chemically-modified cellulose according to claim 1, wherein the extruder has a screw piece, which is a combination of two or more shapes selected from a flight shape, a kneading shape and a torpedo shape.
4. The apparatus for continuously producing chemically-modified cellulose according to claim 1, wherein the dryer comprise one, two or more types selected from a medium fluid dryer, a drum dryer, a thin-film evaporator, a spray dryer, a single screw extruder, and a twin screw extruder.
5. A method for continuously producing chemically-modified cellulose, the method comprising:
a first step of introducing a fine-powder cellulose fiber starting material and a hydrophobizing chemical substance into an extruder having a temperature raising mechanism, a pressure raising mechanism and a degassing mechanism, and having a screw piece for kneading, melting the hydrophobizing chemical substance and kneading the hydrophobizing chemical substance and the cellulose, and further allowing the same to react, in order to yield chemically-modified cellulose; and
a second step of discharging the chemically-modified cellulose from the extruder, introducing the chemically-modified cellulose into a solvent tank and dispersing the chemically-modified cellulose in an organic solvent, in order to yield a fluid dispersion, and thereafter injecting the fluid dispersion into a dryer connected to the solvent tank, and drying the fluid dispersion, in order to separate the chemically-modified cellulose from the organic solvent.
6. The method for continuously producing chemically-modified cellulose according to claim 5, wherein an average particle size d of the fine-powder cellulose fiber starting material is 1 nm≤d≤150 μm.
7. The method for continuously producing chemically-modified cellulose according to claim 5, wherein in the first step, a mixture containing 0.5 parts by mass to 30 parts by mass of the hydrophobizing chemical substance with respect to 100 parts by mass of the cellulose fiber starting material is kneaded.
8. The method for continuously producing chemically-modified cellulose according to claim 5, wherein in the first step, the cellulose fiber starting material and the hydrophobizing chemical substance are allowed to react in a range of 100° C. to 250° C.
9. The method for continuously producing chemically-modified cellulose according to claim 5, wherein in the first step, the cellulose fiber starting material and the hydrophobizing chemical substance are held in the extruder for 7 minutes or longer.
10. The method for continuously producing chemically-modified cellulose according to claim 5, wherein the extruder has a screw piece, which is a combination of two or more shapes from among a flight shape, a kneading shape and a torpedo shape.

11. The method for continuously producing chemically-modified cellulose according to claim 5, wherein the hydrophobizing chemical substance is one, two or more types of carboxylic acid-based compounds selected from compounds having one carboxyl group, compounds having two carboxyl groups, and acid anhydrides of compounds having two carboxyl groups or derivatives thereof.

12. The method for continuously producing chemically-modified cellulose according to claim 11, wherein the acid anhydride of a compound having two carboxyl groups is one, two or more compounds selected from maleic anhydride, succinic anhydride, phthalic anhydride, glutaric anhydride, adipic anhydride, itaconic anhydride, pyromellitic anhydride and 1,2-cyclohexane dicarboxylic anhydride.

13. The method for continuously producing chemically-modified cellulose according to claim 11, wherein the derivative of an acid anhydride of a compound having two carboxyl groups is a compound selected from dimethylmaleic acid anhydride, diethylmaleic acid anhydride and diphenylmaleic acid anhydride.

14. The method for continuously producing chemically-modified cellulose according to claim 5, wherein an acid value of the chemically-modified cellulose is 30 mg/g or higher.

15. The method for continuously producing chemically-modified cellulose according to claim 5, wherein in the second step, a cellulose concentration in the fluid dispersion is set to 1 mass % to 60 mass %, and a temperature, at which the fluid dispersion is dried, ranges from 60° C. to 180° C.

16. An apparatus for continuously producing a cellulose composite resin, comprising:
a first mechanism for transporting a fine-powder cellulose fiber starting material and a hydrophobizing chemical substance;
a first extruder having a hopper for introducing the cellulose fiber starting material and the hydrophobizing chemical substance, and having a temperature raising mechanism, a pressure raising mechanism and a degassing mechanism, and moreover having a screw piece for kneading;
a solvent tank connected to the first extruder;
a dryer connected to the solvent tank;
a paraffin tank;
a mixer connected to the paraffin tank and connected to the dryer via a weighing machine;
a second extruder connected to the mixer and having a hopper for introducing a thermoplastic resin, and a temperature raising mechanism, a pressure raising mechanism and a degassing mechanism, and moreover having a screw piece for kneading; and
a mechanism introducing a thermoplastic resin into the second extruder.

17. The apparatus for continuously producing a cellulose composite resin according to claim 16, wherein an average particle size d of the fine-powder cellulose fiber starting material is 1 nm≤d≤150 μm.

18. The apparatus for continuously producing a cellulose composite resin according to claim 16, wherein the second extruder has a screw piece, which is a combination of two or more shapes selected from among a flight shape, a kneading shape and a gear shape.

19. A method for continuously producing a cellulose composite resin, the method comprising:
a first step of introducing a fine-powder cellulose fiber starting material and a hydrophobizing chemical substance into a first extruder having a temperature raising mechanism, a pressure raising mechanism and a degassing mechanism, and having a screw piece for kneading, melting the hydrophobizing chemical substance and kneading the hydrophobizing chemical substance and the cellulose, and further allowing the same to react, in order to yield chemically-modified cellulose;
a second step of discharging the chemically-modified cellulose from the first extruder, introducing the chemically-modified cellulose into a solvent tank and dispersing the chemically-modified cellulose in an organic solvent, in order to yield a fluid dispersion, and thereafter injecting the fluid dispersion into a dryer connected to the solvent tank, and drying the fluid dispersion, in order to separate the chemically-modified cellulose from the organic solvent; and
a third step of mixing the dried chemically-modified cellulose with paraffin, and thereafter kneading the mixture and the thermoplastic resin by introducing the same into a second extruder having a temperature raising mechanism, a pressure raising mechanism and a degassing mechanism, and moreover having a screw piece for kneading.

20. The method for continuously producing a cellulose composite resin according to claim 19, wherein an average particle size d of the fine-powder cellulose fiber starting material is 1 nm≤d≤150 μm.

21. An apparatus for continuously producing a cellulose nanofiber composite separator for lithium ion batteries, the apparatus comprising a T die or a strand die connected to the apparatus for continuously producing the cellulose composite resin of claim 16.

22. A cellulose nanofiber composite separator for lithium ion batteries, the separator being produced using the apparatus for continuously producing the cellulose nanofiber composite separator for lithium ion batteries of claim 21.

* * * * *